Feb. 1, 1966  A. G. STIMSON  3,232,192
PHOTOGRAPHIC EXPOSURE MEASURING DEVICE
Filed Feb. 20, 1963  4 Sheets-Sheet 1

ALLEN G. STIMSON
INVENTOR.

BY *R. Frank Smith*
*Eugene S. Stephens*
ATTORNEYS

Feb. 1, 1966 A. G. STIMSON 3,232,192
PHOTOGRAPHIC EXPOSURE MEASURING DEVICE
Filed Feb. 20, 1963 4 Sheets-Sheet 2

ALLEN G. STIMSON
INVENTOR.

BY R. Frank Smith
Eugene S. Stephens
ATTORNEYS

Feb. 1, 1966 A. G. STIMSON 3,232,192
PHOTOGRAPHIC EXPOSURE MEASURING DEVICE
Filed Feb. 20, 1963 4 Sheets-Sheet 3

ALLEN G. STIMSON
INVENTOR.

BY R. Frank Smith
Eugene S. Stephens
ATTORNEYS

Feb. 1, 1966 A. G. STIMSON 3,232,192
PHOTOGRAPHIC EXPOSURE MEASURING DEVICE
Filed Feb. 20, 1963 4 Sheets-Sheet 4

ALLEN G. STIMSON
INVENTOR.

BY R. Frank Smith
Eugene S. Stephens
ATTORNEYS

United States Patent Office 3,232,192
Patented Feb. 1, 1966

3,232,192
PHOTOGRAPHIC EXPOSURE MEASURING DEVICE
Allen G. Stimson, Rochester, N.Y., assignor to Eastman Kodak Company, Rochester, N.Y., a corporation of New Jersey
Filed Feb. 20, 1963, Ser. No. 259,914
16 Claims. (Cl. 95—10)

The present invention relates to a photographic exposure measuring device, and more particularly to an exposure meter or exposure control system that is binary in the sense that it uses two photoresponsive elements arranged for accepting light from different selected zones of a scene to be photographed or a field of view of a camera.

Most of the exposure meters known in the prior art employ a single photocell arranged for accepting light from a scene to be photographed. When such an exposure meter is mounted in a camera, its photocell is arranged to be illuminated by light from a field approximating that of the field of view of the camera. It is known that an auxiliary photocell of such an exposure meter may be mounted for accepting illumination falling on the front of the camera from a field much larger than the camera's to compensate the exposure measurement for excessively bright light from outside the picture area.

In such exposure meters, either sole or primary control over the meter's indication is exercised by the single photocell that is arranged for accepting light from the scene to be photographed. Such a photocell reacts to the average brightness of a field substantially corresponding to the camera's field, and the average field brightness often differs from the brightness of a selected central or lower portion of the field which has been found to be more representative of the brightness of the subject or center of interest in most scenes. Hence, when the brightness of peripheral or upper zones of the field contrasts with the brightness of central or lower zones of the field, an exposure meter having a single photocell for accepting field light indicates an exposure which is incorrect for the more important subject or center of interest usually occupying a central field zone. Such incorrect exposure indications are common in scenes containing bright sky or sunlit snow bordering a relatively dark center of interest such as a person, and also in scenes containing shaded or dark areas bordering a brightly illuminated center of interest.

To correct such exposure errors, it is an object of my invention to indicate or automatically regulate proper exposure for the subject or center of interest of a scene to be photographed by arranging a pair of photoresponsive elements for accepting light from selected zones of the scene.

Another object of my invention is to determine correct exposure for a scene to be photographed which has marked contrasts in brightness between its peripheral or upper zones and its central or lower zones.

Another object of my invention is to determine an exposure appropriate for the subject or most important zone of a scene to be photographed.

A further object of my invention is to determine proper exposure for scenes contrasting in brightness between their peripheral or less important zones and their central or more important zones by adjusting the exposure appropriate to a selected zone representative of subject brightness in accordance with the detected contrast in brightness of the respective peripheral zones.

Another object of my invention is to indicate or control the photographic exposure of a variety of scenes so as to produce photographs highly probable of being judged pleasing by a large majority of the people who view them.

Another object of my invention is to arrange a binary exposure meter on a camera so as to indicate or control correct exposure for the central or more important zone of the field of view of the camera.

Another object of my invention is automatically to control exposure in a camera so as to produce photographs in which the subject or center of interest is correctly exposed.

These and other objects of my invention are accomplished by connecting at least two photoresponsive elements in opposed relation with an electric-to-mechanical transducer of an exposure measuring device for jointly influencing the output of the transducer. The two photoresponsive elements contributing to such joint influence include a first or dominant element arranged for accepting light from a first selected zone of the scene to be photographed, such first zone being representative of the brightness of the subject or center of interest of the scene, and a second or recessive element arranged for accepting light from a second zone of the scene to be photographed, such second zone including peripheral or less important zones of the scene. With such an arrangement of photoresponsive elements, the transducer stimulus produced by the first photoresponsive element is modified according to the brightness detected by the second photoresponsive element.

The invention will be more clearly understood by reference to the drawings wherein.

Figure 1:
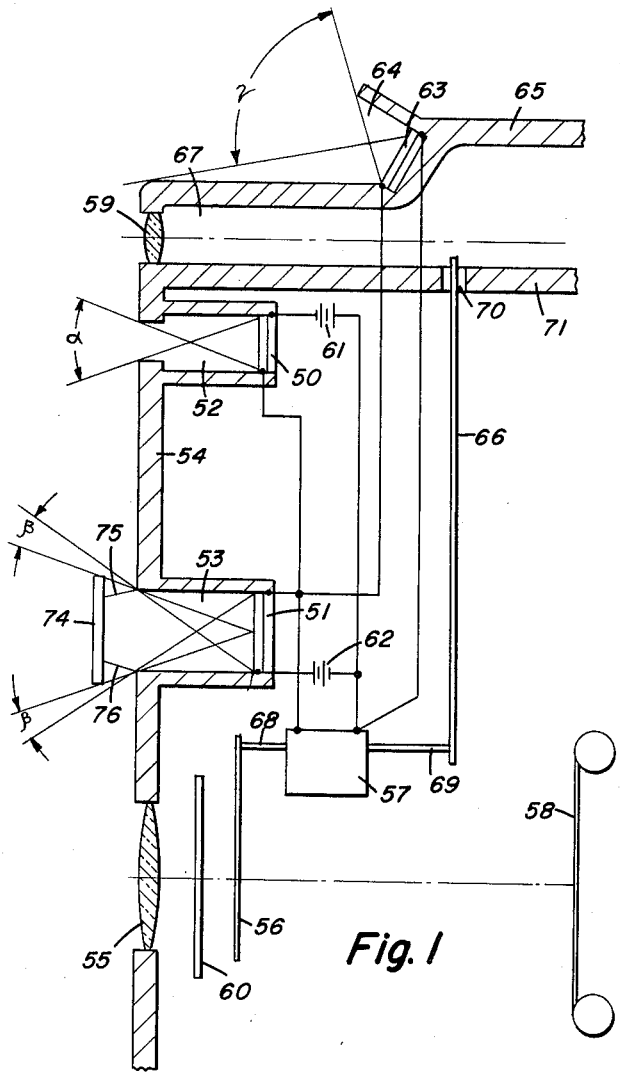
FIG. 1 shows a partially schematic, partially sectioned side view of an exposure meter according to the invention mounted in a camera.

As shown in FIG. 1, an exposure meter according to this invention contains two photoresponsive elements 50 and 51 which are shown as photoconductive cells, although any combination of a variety of photoresponsive elements may be used including photoemmisive cells, photovoltaic cells, photoconductive cells, and phototransistors. A first or dominant one of the photoresponsive elements (hereinafter referred to as "α cell") is indicated as cell 50, and a second or recessive one of the photoresponsive elements (hereinafter referred to as "β cell") is indicated as cell 51.

The α cell 50 and the β cell 51 may be mounted in an exposure meter that is separate from a camera, but they are shown in FIG. 1 as mounted in respective recesses 52 and 53 in the front wall 54 of a camera that is schematically represented as having an objective lens 55, a shutter 60, and a diaphragm vane 56 for controlling exposure of film 58. The camera is also shown as having a viewfinder generally indicated at 67 and having a lens 59. The α cell 50 and the β cell 51, with their respective batteries 61 and 62, are connected in opposed parallel relation with an electric-to-mechanical transducer shown as electric measuring instrument 57 so that the electric signal from α cell 50 for deflecting instrument 57 is opposed by or decreased by the electric signal from β cell 51.

Electric measuring instrument 57, which may be a moving coil galvanometer or any other suitable electric-to-mechanical transducer, is shown as having a shaft 68 that is rotatable or deflectable as a function of the electric signal applied to the instrument. Diaphragm vane 56, fastened to shaft 68, is pivotally adjustable according to deflection of instrument 57, and has a well-known variable aperture for setting diaphragm aperture size according to the rotational position of vane 56. The instrument 57 also has a shaft 69 rotatable with shaft 68 and to which is fastened indicia scale 66 arranged for movement in the viewfinder 67 through an aperture 70 in viewfinder wall 71 for producing an indication visible to the camera operator.

Of course, the invention is not limited to use of a measuring instrument such as instrument 57, and α and β cells may be employed in any of a great variety of photographic exposure control systems including many which do not indicate exposure values to a camera operator and many which use electromagnetic control systems that have no electric measuring instrument in the usual sense.

Photoresponsive element 63 which is shown as a photoconductive cell, but which may be any type of a variety of photoresponsive elements, is shown connected across instrument 57 for shunting instrument current in response to illumination of cell 63. Cell 63 is mounted in recess 64 in upper camera wall 65 for accepting illumination within the angle γ. Such a mounting of γ cell 63 makes it sensitive to sky light and backlighting of the scene to be photographed, and it is selected so that its resistance at the maximum illumination it will receive is approximately equal to the resistance of electric measuring instrument 57. Therefore, at high levels of illumination, γ cell 63 will shunt current from instrument 57 and thereby cause a desirable increase in exposure. However, very satisfactory exposures may be made by omitting γ cell 63 and relying upon α cell 50 and β cell 51.

Cells 50 and 51 are each aimed at the scene to be photographed, and are arranged for accepting light from different selected zones or portions of such scene. Because the exposure meter comprising cells 50 and 51, batteries 61 and 62, and electric measuring instrument 57 with its movable indicating scale 66 visible in the viewfinder 67 is mounted on a camera as shown in FIG. 1, the scene to be photographed and from which cells 50 and 51 accept light, corresponds to the field of view of the camera.

The α cell 50 having acceptance angle α is arranged for accepting light from the central zone or center of interest of the field of view, and is arranged in circuit with the electric measuring instrument 57 so as to be more effective than β cell 51 in deflecting the instrument 57. Good results have been obtained by using α cells which were from 2½ to 5 times as effective as the β cell, and proportions outside such a range also produce pleasing exposures. A satisfactory relative influence ratio between α and β cells in an α cell 4 times as influential as a β cell. To accomplish this, battery 61 that applies voltage to α cell 50 is four times as powerful as battery 62 that applies voltage to β cell 51. Alternatively, batteries 61 and 62 could be of equal or other relative value, and the β cell 51 could be attenuated by a filter. Also, resistances could be arranged in the circuit including the cells 50 and 51 and the instrument 57 so as to make α cell 50 more influential than β cell 51 in controlling instrument 57. This dominance of α cell 50 in controlling deflection of the instrument 57 provides the necessary exposure emphasis on the scene's center of interest, the representative brightness of which is viewed by the α cell.

The β cell 51 which accepts a ring of light between the β angles is arranged so that such light comes from peripheral zones or portions of the field of view that are less important than the center of interest. The β cell 51 is connected with instrument 57 in opposed parallel relation with α cell 50 for reducing or opposing the α cell electric signal in accordance with the brightness of peripheral scene zones.

FIGS. 2–6 illustrate five patterns or zone combinations of scene light acceptance by the α and β cells respectively for accomplishing the invention. For clarity, the α zone of each zone combination is illustrated to the left of the β zone, but the actual scene light acceptance of the α and β cells is from zones centered with respect to the vertical axis of the scene and such as those patterns resulting from moving the illustrated α zones to the right into respective vertical centerline alignment with the illustrated β zones. For each zone combination, the α zone is selected as generally representative of the brightness of the subject or center of interest of the scene even though such zone need not be taken from the geometric center of the scene. Each respective β zone includes areas less representative of subject brightness, especially upper and side areas.

Figure 2:
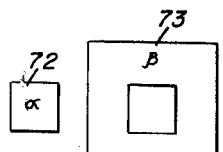
FIGS. 2–6 show various divisions of a scene to be photographed into zones from which two photoresponsive elements may accept light according to the invention.

The zones shown in FIG. 2 represent the light acceptance patterns for α and β cells as in FIG. 1, where α cell 50 accepts light from a central zone of the scene to be photographed such as the zone 72 of FIG. 2 as compared to a peripheral ring or zone 73 of the scene to be photographed from which β cell 51 accepts illumination. Light from the interior of ring 73 falls on α cell 50 but does not reach β cell 51 because it is blocked by a mask 74 shown in FIG. 1 as fixed to camera wall 54 in front of β cell 51 by means of wires 75 and 76.

Figure 3:
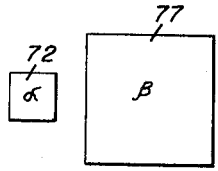

Another satisfactory division of the field of view into zones respectively "seen" by the α and β cells is illustrated in FIG. 3 where the α cell accepts light from a central scene zone 72 and the β cell 51 accepts light from the entire scene zone 77. Such a pattern of light acceptance can be achieved by the cell arrangement resulting when the mask 74 (FIG. 1) is removed from in front of β cell 51. Although the relative sizes of the α and β zones may be varied, suitable zone proportions can be produced by arranging the α cell for accepting light from a telephoto angle field and arranging the β cell for accepting light from a wide angle field.

Figure 4:
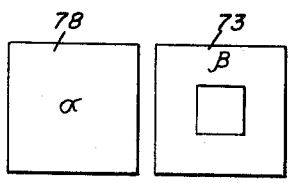

Another possible division of the scene into zones respectively "seen" by the α and β cells is illustrated in FIG. 4 where the α cell accepts illumination from the entire scene zone 78, and the β cell accepts illumination from a peripheral scene zone represented by ring 73.

Figure 5:
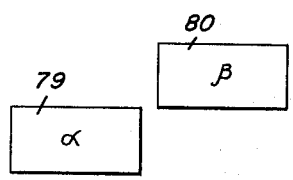

As illustrated in FIG. 5, the scene to be photographed may be divided into zones such that the α cell accepts illumination from a lower scene zone 79 and the β cell accepts illumination from an upper scene zone 80.

Figure 6:
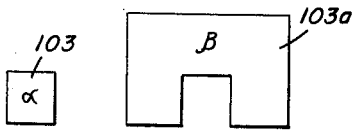

Also, as shown in FIG. 6, a relatively small zone 103 from the center of the lower portion of the scene can be viewed by the α cell and the remainder of the scene, illustrated as zone 103a, or the entire scene, can be viewed by the β cell.

Of course, any of the scene zones illustrated in FIGS. 2–5 may be formed in shapes other than rectangular, for example, circular or irregular, and relative zone sizes may be changed, and other zoning of the field of view is possible within the spirit of the invention.

Figure 7:
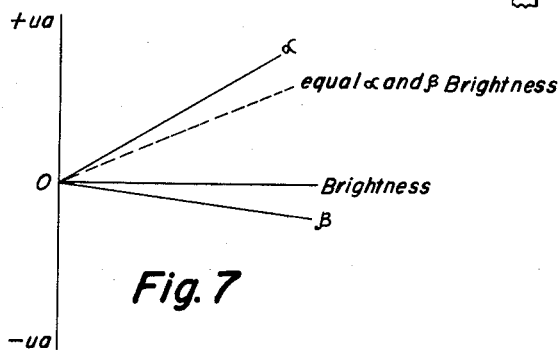
FIG. 7 shows a graph of the current outputs with respect to detected brightness for two photoresponsive elements arranged according to the invention.

With the α and β cells arranged for accepting illumination from distinct zones of the field of view, such as one of the combinations illustrated in FIGS. 2–6, and with the β cell arranged to be approximately ¼ as effective as the α cell in influencing instrument deflection, the graph of FIG. 7 shows electric currents responsive to α and β cells as a function of the brightness of their respective scene zones. The α line in the graph of FIG. 7 shows current in microamperes in response to illumination of the dominant α cell or the current that would result if the β cell were removed from the circuit. The β line of the graph shows microamperes of current in an opposite direction in response to illumination of the β cell or the current that would result if the α cell were removed from the circuit. The actual current in instrument 57 is the algebraic sum of the α and β currents, and the parameters of the α and β cells are selected so that such algebraic sum normally falls on the positive or α side of the ordinate. Of course, voltages across the instrument from the α and β cells and their respective batteries or from α and β photovoltaic cells are proportional to the currents indicated in the graph of FIG. 7, and are similarly related to brightness. Thus, such graph could also be considered to represent opposing α and β voltages in response to which instrument 57 deflects.

The broken line for equal α and β brightness shows the instrument current as a function of brightness values which are equal for the α and β zones. This line is found by subtracting the β value for a given point on the abscissa from the α value for the same point. However, α and β zone brightnesses are nearly always unequal, and most often the β zone is brighter than the α zone. Thus, α and β values almost always lie opposite different points on the abscissa.

It can be seen from the graph of FIG. 7 that if the β zone is brighter than the α zone, e.g. a scene having a bright sky and a dark center of interest, the α current will be reduced to a value below that for equal α and β zone brightness. Such instrument-deflecting current is below that which would be "normal" for the average brightness of the center of interest and causes decreased deflection and increased exposure. The result is greater exposure of the brightest zones of the scene, and a slightly greater than "normal" exposure of the center of interest of the scene that results in a photograph that is more pleasantly exposed than one exposed according to average brightness of the center of interest. Conversely, if the peripheral scene zone is darker than the center of interest, very little reduction of the α current will be made, and the resulting instrument current will fall above the broken line for equal α and β brightness. Thus, for such a scene, the determined exposure is less than that which would be "normal" for the average brightness of the center of interest and the result is a more pleasing exposure of the subject and less exposure of the darkest zones.

Figure 8:
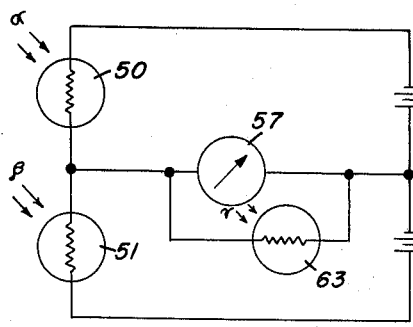
FIGS. 8–13 show schematic diagrams of various electrical circuits embodying the invention.

FIGS. 8–13 show various circuit arrangements for connecting α and β cells with an electric measuring instrument according to the invention. FIG. 8 shows the circuit of FIG. 1 with α cell 50 and β cell 51, along with their respective batteries 61 and 62 connected in opposed parallel relation with electric measuring instrument 57 which is shunted by γ cell 63.

Figure 9:
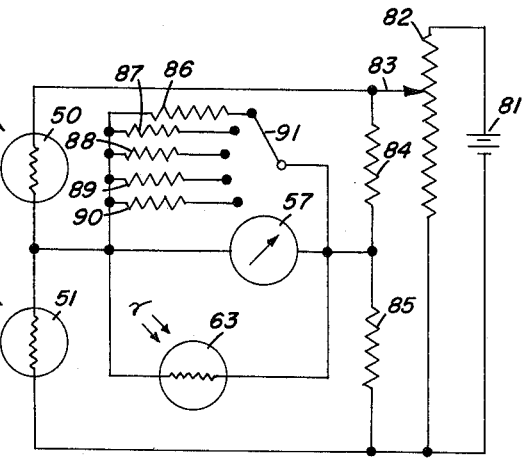

In FIG. 9 is shown an embodiment of the invention in a circuit powered by a single battery 81. Potentiometer 82 is connected across battery 81, and has an adjustable tap 83 by which circuit voltage can be adjusted or attenuated to compensate for exposure variations such as film speed. The voltage supply for α cell 50 is provided by the voltage drop across the resistor 84, and the voltage supply for β cell 51 is provided by the voltage drop across resistor 85. Thus, relative voltages for the cells 50 and 51 can be provided by selecting proper relative resistance values of resistors 84 and 85. The γ cell 63 can be added to the circuit for shunting instrument 57 upon detection of backlighting of the scene or excessive illumination as described above. Additional circuit attenuating means is shown as resistors 86–90 and selector switch 91 arranged for shunting the instrument 57 for adjusting its sensitivity according to shutter speed setting.

Figure 10:
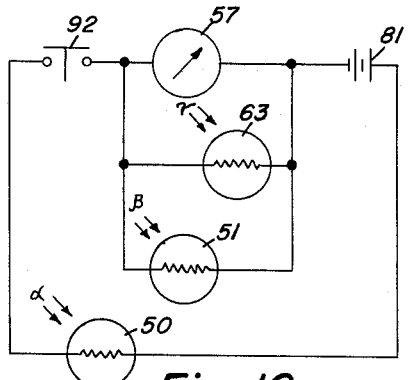
Figure 11:
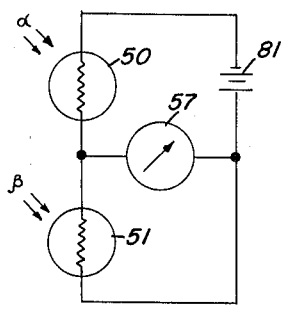

In FIG. 10 is shown another circuit embodying the invention and powered by a single battery 81. With switch 92 closed, α cell 50 assumes dominant control of deflection of instrument 57 which is shunted by β cell 51 and γ cell 63. In this circuit the shunting effect of β cell 51 depends upon the relation between its resistance and that of the instrument 57. The β cell 51 acts as a similar shunt for the instrument 57 in the circuit shown in FIG. 11 which is also powered by a single battery 81 in such a way as to allow α cell 50 to assume dominant control over deflection of instrument 57.

Figure 12:
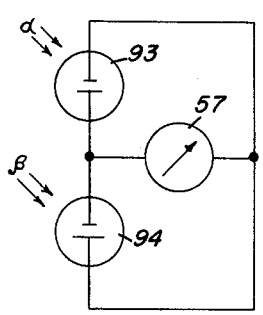
Figure 13:
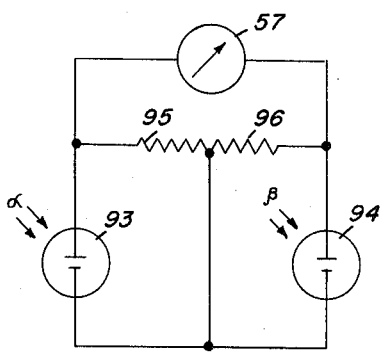

FIGS. 12 and 13 show two embodiments of the invention employing photovoltaic cells. The α cell 93 and β cell 94 are connected in opposed parallel relation with electric measuring instrument 57 as shown in FIG. 12, and electric measuring instrument 57 deflects in response to the difference in voltages developed by the two cells. Since the cells are operating in additive relationship, the circuit of FIG. 12 is essentially a current circuit. A voltage circuit employing photovoltaic cells is illustrated in FIG. 13 where α cell 93 and β cell 94 are connected in an opposed relation which causes opposed voltages to appear across resistances 95 and 96. Electric measuring instrument 57 deflects in response to the difference in voltage across resistors 95 and 96.

Selenium and silicon photocells are included among the photovoltaic cells suitable for incorporation into the circuits shown in FIGS. 12 and 13. Photovoltaic cells may also be incorporated into circuits containing photoconductive cells.

Figure 14:
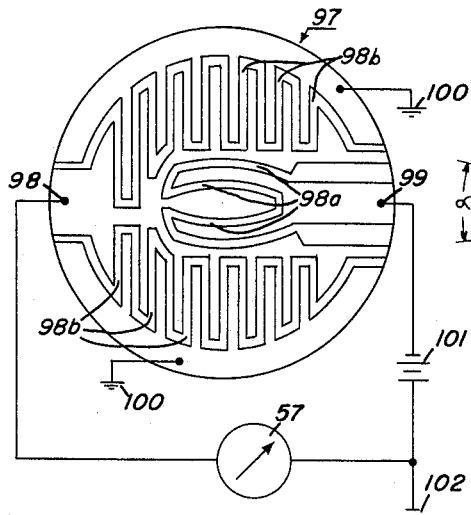
FIG. 14 shows a front view of a three-terminal photoresponsive element having an electrode pattern arranged for detecting the brightness of two separate zones of a scene to be photographed according to the invention.

In FIG. 14 shows arrangement of both an α cell and a β cell on the same substrate as a unit. Such a combination of cells, illustrated generally at 97, is formed by arranging electrode patterns on a light-sensitive resistance material so as to form three terminals indicated at 98, 99, and ground terminal 100. An illumination-responsive resistance path or cell area located in the central area of element 97, between terminals 98 and 99 forms an α cell 98a powered by battery 101 and connected across electric measuring instrument 57. A β cell 98b is formed by light-responsive resistance paths between terminals 98 and 100, and such resistance paths are formed on an area of element 97 peripheral to the central zone occupied by the α cell. The β cell is powered by battery 102 and is connected to instrument 57 in opposed parallel relation to the α cell.

Figure 15:
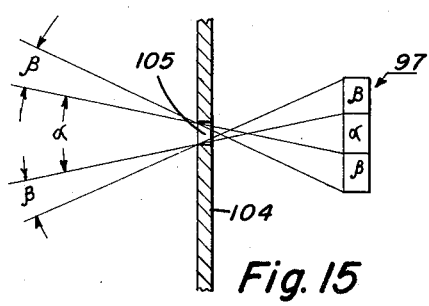
FIG. 15 shows a partially schematic side view of the arrangement of a photoconductive cell according to FIG. 14 with respect to a light-receiving aperture.

Element 97 is mounted behind a light accepting aperture 105 in a wall 104 of a camera or cell enclosure as shown in FIG. 15. The central α zone of element 97 has an acceptance angle α for receiving light from a central zone of the scene to be photographed. The peripheral β zone of element 97 accepts a ring of light between the β angles from the peripheral zone of a scene to be photographed. Such a mounting of element 97 accomplishes the functions of a pair of α and β cells arranged for accepting light from scene zones similar to zones 72 and 73 illustrated in FIG. 2.

Figure 16:
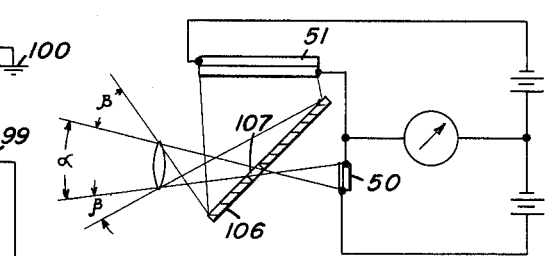
FIGS. 16 and 17 show lens and mirror arrangements for directing onto two separate photoresponsive elements light from selected zones of the scene to be photographed according to the invention.
Figure 17:
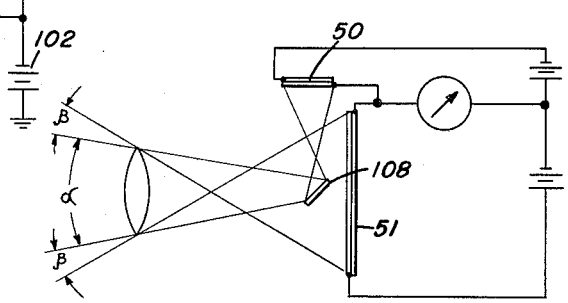

Light from the scene zones as illustrated in FIGS. 2 or 6 can be directed onto two cells by either of the mirror arrangements illustrated in FIGS. 16 and 17. In FIG. 16 an apertured mirror 106 permits light from the central zone of the scene to be photographed to pass through aperture 107 and fall on α cell 50. Light from the peripheral zone of the scene to be photographed is reflected by mirror 106 onto β cell 51. In FIG. 17 is shown a mirror 108 which reflects light from a central zone of the scene to be photographed onto α cell 50. Light from the peripheral zone of the scene to be photographed passes around mirror 108 and falls on β cell 51.

Figure 18:
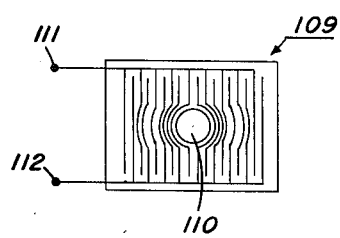
FIG. 18 shows a front view of a photoconductive cell having a central aperture surrounded by an electrode pattern.
Figure 19:
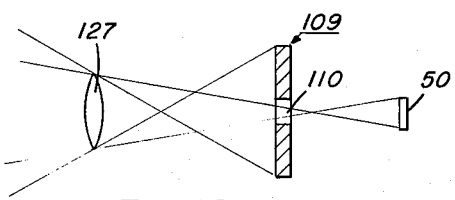
FIG. 19 shows a partially schematic side view of an arrangement of an apertured photocell backed up by another photocell for accepting light from selected zones of the scene to be photographed according to the invention.

In FIG. 18 is shown a photoconductive cell indicated generally at 109 and having electrode patterns formed around a central aperture 110. With such a cell arranged behind a light accepting lens 127, as illustrated in FIG. 19, light-sensitive resistance paths between terminals 111 and 112 are illuminated by light from the peripheral zone of a scene, and light from the central zone of the scene passes through the aperture 110 and falls on an α cell 50 located behind the cell 109.

Figure 20:
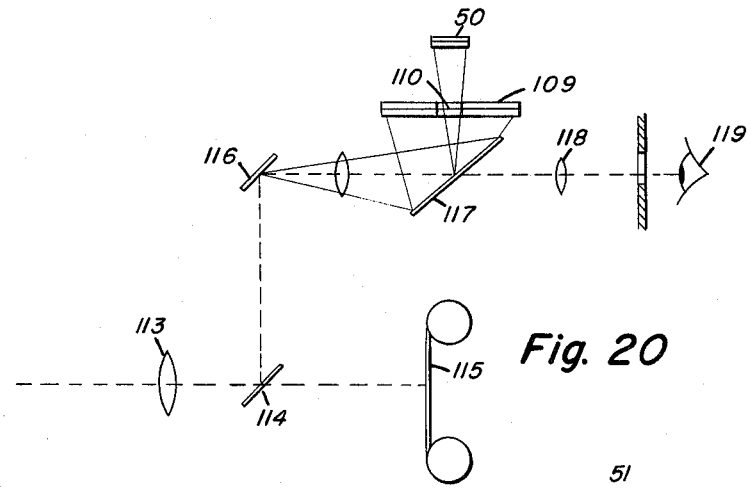
FIGS. 20 and 21 show beam-splitter and mirror arrangements for directing onto two separate photocells in a reflex camera light from selected zones of the scene to be photographed.
Figure 21:
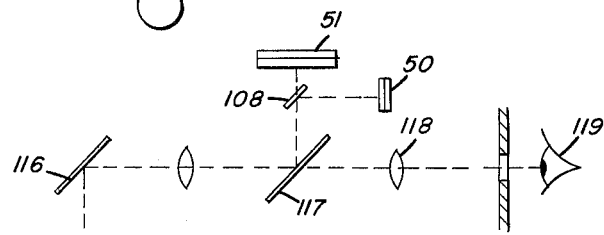

FIGS. 20 and 21 show mounting of α and β cells in a reflex camera. A beam-splitter 114 placed behind camera objective 113 intercepts some of the light directed toward film 115 and reflects it onto viewfinder mirror 116. A second beam-splitter 117 passes a portion of the light to the viewfinder eyepiece lens 118 where it is visible to the camera operator illustrated as 119, and directs a portion of the light upward onto α and β cells. In FIG. 20, β cell 109 is an apertured cell such as illustrated in FIG. 18. The α cell 50 is placed behind aperture 110 in β cell 109 so as to accept a relatively narrower angle of light from the central zone of the scene to be photographed. In FIG. 21, a mirror 108 directs illumination from the central zone of the scene to be photographed onto α cell 50, and peripheral scene light passes by mirror 108 and falls upon β cell 51 in a way similar to that of the embodiment illustrated in FIG. 17. Cells as arranged similarly to the embodiments of FIGS. 20 and 21 can accept zones of scene light such as zones 72 and 73 as illustrated in FIG. 2, or zones 103 and 103a as illustrated in FIG. 6.

Figure 22:
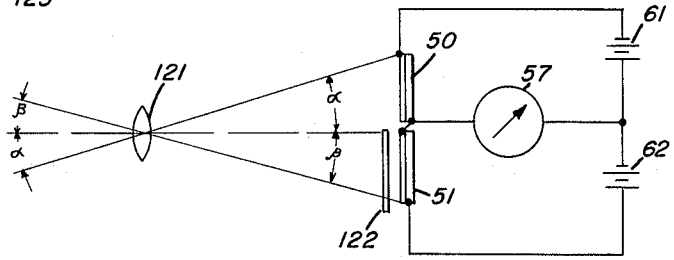
FIG. 22 shows a partially schematic side view of an arrangement of two photocells for accepting light from selected zones of the scene to be photographed according to the invention.

In FIG. 22 is illustrated an arrangement of an α cell 50 and a β cell 51 for accepting light from scene zones such as zones 79 and 80 as illustrated in FIG. 5. The α cell 50 and β cell 51, powered respectively by batteries 61 and 62, are connected in opposed relation with electric measuring instrument 57.

Light from the scene to be photographed, upon passing through lens 121 is inverted so that light from an upper zone of the scene to be photographed falls upon β cell 51, and light from a lower zone of the scene to be photographed falls upon α cell 50. β Cell 51 is attenuated by a neutral density filter 122 positioned in front of cell 51.

Figure 23:
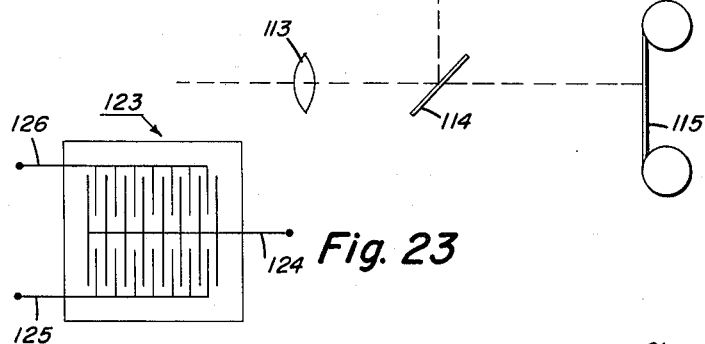
FIG. 23 shows a front view of a photoresponsive element having an electrode pattern arranged for detecting the brightness of two separate zones of a scene to be photographed.

The α and β cells of FIG. 21 may be formed on the same substrate in an arrangement such as the three electrode element 123 illustrated in FIG. 23. The α cell of element 123 is formed by the light-sensitive resistance path between terminals 124 and 126, and the β cell of element 123 is formed by the light-sensitive resistance path between terminals 124 and 125, terminal 124 being common to both cells.

The photocell arrangement illustrated in FIG. 22 may be modified for special types of photography. For a scene non-uniformly illuminated as by artifical light, one of the cells can be deactivated by a movable mask (not shown), or by disconnection from the circuit, and the exposure meter may be operated by the single remaining cell which is aimed at the center of the scene to be photographed by adjustment of the lens 121 or the cell. For such operation, it is best to deactivate the β cell because the more influential α cell can make the instrument 57 more sensitive to scene brightness. An alternative way to operate the embodiment of FIG. 22 for artifically illuminated scenes is to connect the α and β cells in aiding or reinforcing relation with the instrument 57 by switch means (not shown). This would increase the system's light sensitivity. For scenes such as outdoor winter scenes in which the foreground contains brightly illuminated snow, the neutral density filter 122 may be moved to cover α cell 50, or the cells may be transposed so that the α and β cells are reversed in function for improving the exposure of the center of interest of the scene.

The invention has been described in detail with particular reference to preferred embodiments thereof, but it will be understood that variations and modifications can be effected within the spirit and scope of the invention as described hereinabove and as defined in the appended claims.

I claim:

1. In combination with a camera having a predetermined photographic field of view, an exposure control system comprising means movable for adjusting exposure of photosensitive material in said camera; mans responsive to an electric signal for positioning said movable means as a function of a predetermined characteristic of said signal; at least two photoresponsive means electrically directly connected in electrically opposed relation with said positioning means for jointly regulating said means for positioning said movable means as a function of the difference in luminous flux falling respectively on said photoresponsive means, a first one of said photoresponsive means being supported by said camera in a position for accepting light from a first selected zone of a scene lying within said photographic field and which is to be photographed, and a second one of said photoresponsive means being supported by said camera in a position for accepting light from a second selected zone of said scene, both of said zones concurrently lying substantially completely within said photographic field, and each of said photoresponsive means being shielded from light from outside its respective zone.

2. The exposure control system of claim 1, wherein said first photoresponsive means accepts light from a central zone of said scene and said second photoresponsive means accepts light from a peripheral zone of said scene.

3. The exposure control system of claim 1, wherein said first photoresponsive means accepts light from a central zone of said scene and said second photoresponsive means accepts light from the entire scene.

4. The exposure control system of claim 1, wherein said first photoresponsive means accepts light from the entire scene and said second photoresponsive means accepts light from a peripheral zone of said scene.

5. The exposure control system of claim 1, wherein said first photoresponsive means accepts light from a lower zone of said scene and said second photoresponsive means accepts light from an upper zone of said scene.

6. The exposure control system of claim 1, wherein said second photoresponsive means is arranged to be less effective than said first photoresponsive means in said joint regulation.

7. The exposure control system of claim 1, wherein said first photoresponsive means accepts light from a lower central zone of said scene and said second photoresponsive means accepts light from the entire scene.

8. The exposure control system of claim 1, wherein said first photoresponsive means accepts light from a lower central zone of said scene and said second photoresponsive means accepts light from the remainder of said scene.

9. The exposure control system of claim 1, wherein said first photoresponsive means accepts light from a first zone of said scene selected as representative of subject brightness, and said second photoresponsive means accepts light from the entire scene.

10. The exposure control system of claim 1, wherein said first photoresponsive means accepts light from a first zone of said scene selected as representative of subject brightness, and said second photoresponsive means accepts light from the remainder of said scene.

11. The exposure control system of claim 1, wherein a third one of said photoresponsive means is arranged on said camera for accepting light from a third zone relatively wider than said scene and elevated with respect to said scene, said third photoresponsive means being arranged for shunting said positioning means.

12. In combination with a camera having a predetermined photographic field of view, a photographic exposure meter comprising an electric-to-mechanical transducer and being arranged for adjusting film exposure appropriate for the field of view of said camera, said exposure meter having a first photoresponsive means positioned for accepting light from and only from a first selected zone lying substantially completely within said field of view and having a second photoresponsive means positioned for accepting light from and only from a second selected zone concurrently lying substantially completely within said field of view, said first and second photoresponsive means being connected in electrically opposed relation with said transducer.

13. In a camera having a predetermined photographic field of view and incorporating an exposure meter having an electric-to-mechanical transducer including a means positionable as a function of a characteristic of an electric signal applied to said transducer to affect film exposure, the improvement wherein said exposure meter comprises at least two photoresponsive means electrically directly connected in electrically opposed relation with said transducer for jointly regulating said transducer as a function of the difference in luminous flux falling respectively on said photoresponsive means, a first one of said photoresponsive means being supported by said camera in a position for accepting light from and only from a first selected zone lying substantially completely within said field of view, and a second one of said photoresponsive means being supported by said camera in a position for accepting light from and only from a second selected zone concurrently lying substantially completely within said field of view.

14. The exposure meter of claim 13 wherein said second photoresponsive means is less effective than said first photoresponsive means in said joint regulation.

15. In combination with a camera having a predetermined photographic field of view, an exposure control system having an electric measuring instrument including a means movable as a function of electric current in said instrument, and having a film exposure setting means adjustable according to the position of said movable means, the improvement comprising: at least two photoresponsive means electrically directly connected in electrically opposed relation with said instrument for jointly regulating said current in said instrument as a function of the difference in luminous flux falling respectively on said means, a first one of said means being supported by said camera in a position for accepting light from and only from a first selected zone of a scene to be photographed, and a second one of said means being supported by said camera in a position for accepting light from and only from a second selected zone of said scene, both of said zones concurrently lying substantially completely within said photographic field.

16. In combination with a camera having a predetermined photographic field of view, an electric-to-mechanical transducer including an exposure adjusting means positionable as a function of an electric signal in said transducer to affect film exposure; a dominant photoresponsive means supported by said camera in a position for accepting light from and only from a first selected zone of a scene to be photographed by said camera, said dominant means being electrically connected with said transducer for preponderantly controlling said signal in the latter as a function of the brightness of said first zone; and a recessive photoresponsive means supported by said camera in a position for accepting light from and only from a second selected zone of said scene, said recessive means being connected with said transducer in electrically opposed relation with said dominant means for adjusting said preponderantly controlled signal as a function of the brightness of said second zone, both of said zones concurrently lying substantially completely within said photographic field.

References Cited by the Examiner

UNITED STATES PATENTS

| | | | |
|---|---|---|---|
| 2,378,433 | 6/1945 | Riszdorfer | 95—10 X |
| 2,493,928 | 1/1950 | Rath | 95—64 |
| 2,501,365 | 3/1950 | Varden | 88—24 |
| 3,013,232 | 12/1961 | Lubin | 338—17 |
| 3,027,528 | 3/1962 | Harman et al. | 338—17 |
| 3,073,220 | 1/1963 | LaRue | 95—10 |
| 3,073,223 | 1/1963 | Stimson | 95—10 |
| 3,091,166 | 5/1963 | Norwood | 95—64 |
| 3,093,043 | 6/1963 | Kinder | 95—10 |

NORTON ANSHER, *Primary Examiner.*

EMIL G. ANDERSON, *Examiner.*